United States Patent

Dutta et al.

Patent Number: 5,608,566
Date of Patent: Mar. 4, 1997

[54] MULTI-DIRECTIONAL ELECTRO-OPTIC SWITCH

[75] Inventors: Mitra Dutta, Tinton Falls; Joel R. Shappirio, Ocean, both of N.J.

[73] Assignee: The United States of America as represented by the Secretary of the Army, Washington, D.C.

[21] Appl. No.: 513,701

[22] Filed: Aug. 11, 1995

[51] Int. Cl.⁶ .............. G02F 1/03; G02F 1/295; G02B 6/10
[52] U.S. Cl. .............. 359/248; 385/9; 385/16; 385/131
[58] Field of Search .............. 359/248; 385/8, 385/9, 16, 17, 131; 257/14, 15

[56] References Cited

U.S. PATENT DOCUMENTS

| | | | |
|---|---|---|---|
| 4,198,116 | 4/1980 | Papuchon | 385/9 |
| 4,546,244 | 10/1985 | Miller | 359/243 |
| 4,597,638 | 7/1986 | Chemla et al. | 359/244 |
| 4,787,691 | 11/1988 | Lorenzo et al. | 385/9 |
| 4,904,859 | 2/1990 | Goossen et al. | 250/214 R |
| 4,923,264 | 5/1990 | Langer et al. | 385/2 |
| 5,082,342 | 1/1992 | Wight et al. | 385/8 |
| 5,105,301 | 4/1992 | Campi | 359/245 |
| 5,153,687 | 10/1992 | Ishikawa et al. | 359/248 |
| 5,347,601 | 9/1994 | Ade et al. | 385/9 |

FOREIGN PATENT DOCUMENTS

| | | | |
|---|---|---|---|
| 0121401 | 10/1984 | European Pat. Off. | 385/9 |
| 0000186 | 1/1979 | Japan | 385/9 |
| 2212934 | 8/1989 | United Kingdom | 385/9 |

OTHER PUBLICATIONS

D. A. B. Miller et al, Physics Review, 15 Jul. 1985, B32, p. 1043.
D. A. B. Miller, "Optoelectronic applications of quantum wells", Optics Photonics, vol. 1, No. 2, p. 7, Feb. 1990.
Cada et al, "Multiple Quantum Well Coupling Element with Losses", Applied Physical Letters, vol. 51 (10), Sep. 1987.

*Primary Examiner*—Georgia Y. Epps
*Assistant Examiner*—Evelyn A. Lester
*Attorney, Agent, or Firm*—Michael Zelenka; William H. Anderson

[57] ABSTRACT

A multiple quantum well layer is sandwiched between two core waveguide layers, which are, in turn, sandwiched by two cladding layers. This layering is deposited on a substrate with a metal contact and the top cladding layer is formed so as to form at least two parallel channels with metal contacts. The refractive indices of the various materials comprising the layers are chosen such that the cladding layers and the multiple quantum well layer have refractive indices which are less than the refractive index of the core waveguide layers, but which are different from one another. In operation, an electric field is applied to the structure via metal contacts on the parallel channels. Depending on the magnitude of the electric field the optical signal may be switched from one channel to the other channel and depending on the magnitude and direction of the electric field and the intensity of the optical signal, the optical signal may be switched from the upper waveguide to the lower waveguide.

1 Claim, 1 Drawing Sheet

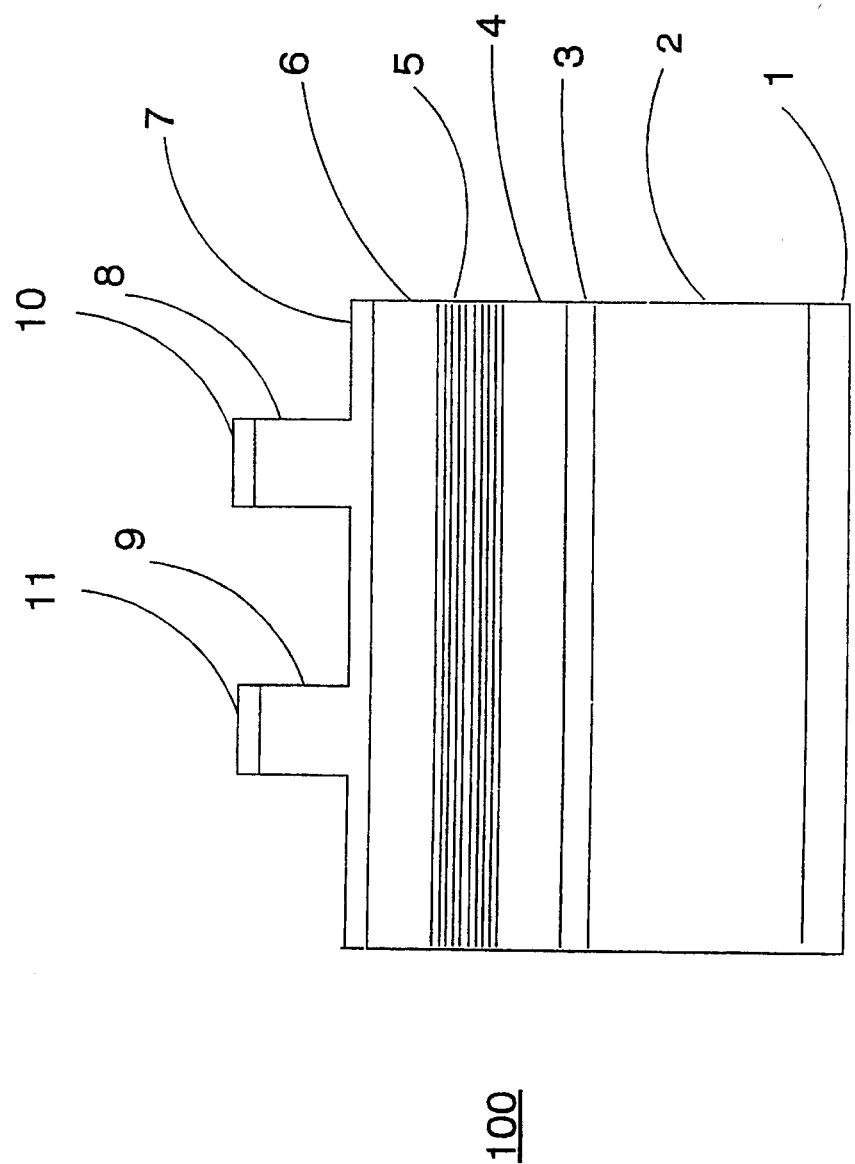

MULTI-DIRECTIONAL ELECTRO-OPTIC SWITCH

GOVERNMENTAL INTEREST

The invention described herein may be made, used, sold, imported and/or licensed by, or on behalf of, the United States of America without the payment to us of any royalties thereon.

FIELD OF THE INVENTION

The present invention relates in general to the field of electro-optic light modulators and/or switches and, in particular, relates to electro-optic switches that are capable of switching in a multitude of directions.

BACKGROUND OF THE INVENTION

Multiple quantum wells are semiconductor structures comprised of alternating thin layers of two different semiconductor materials and, in particular, of semiconductor materials having differing bandgaps. Typically, layer thicknesses are of the order of 100 Angstroms and a typical structure might comprise 100 such layers, resulting in a total thickness of about 1 micrometer. Multiple quantum well structures are typically produced using well known epitaxy techniques, such as molecular beam epitaxy or metal-organic chemical vapor deposition sometimes known as organometallic vapor phase epitaxy. Multiple quantum well structures have been used successfully in many different optical devices, such as optical modulators.

The quantum confined Stark effect (QCSE) has given rise to several innovations in electro-optic modulators. Such modulators have many applications in communications and special purpose computer systems. The principals behind the QCSE have been more fully explained by D. A. B. Miller et al, in *Physics Review*, 1985, B32, p1043. Briefly though, the QCSE is a phenomenon which arises when an electric field is applied across the plane of heterostructure superlattices. In a quantum well at zero electric field, the electron and hole energy levels are defined by the well width, and the electrons and holes are strongly confined in the well layer. However, when an electric field is applied, the electrons and holes are moved apart and their energies are altered. This has the effect of shifting the absorption resonance to lower energy as well as modulating the strength of the absorption. This occurs because direct optical absorption of a photon above the band gap energy involves raising an electron from one of the valence bands and putting it in the conduction band, otherwise known as formation of an electron-hole pair. This shift in the absorption resonance, then, provides for the optical modulation of any radiation that is incident to the heterostructure.

A typical structure for such an optical modulator, also known as a quantum confined Stark effect (QCSE) modulator, is a p-i-n diode with the multiple quantum well structure formed within the intrinsic layer of the diode, i.e., the "i" region. In operation, a light beam is either directed perpendicular to the multiple quantum well layers or in the plane of the layers in a waveguide configuration, while at the same time a reverse bias is applied to the diode. Modulation of the light beam is effected by varying the reverse bias. An example of such a device is found in U.S. Pat. No. 5,105, 301, issued on Apr. 14, 1992 to Campi and entitled, "Coupled Quantum Well Electro-optical Modulator."

Examples of both electrically controlled and optically controlled multiple quantum well devices can also be found in an article by D. A. B. Miller, "Optoelectronic applications of quantum wells," Optics Photonics, vol 1, no. 2, page 7, Feb. 1990; U.S. Pat. No. 4,546,244, issued in October, 1985 to Miller; and U.S. Pat. No. 4,904,859, issued on Feb. 27, 1990 to Goossen et al and entitled, Self Electro-optic Effect Device Employing Asymmetric Quantum Wells."

In other types of devices, waveguides are formed side by side in a common plane with a suitable coupling material between. Typically, the index of refraction in the two waveguides is identical and that of the coupling material is lower so that there is resonant coupling between the waveguides in a cross propagation or "switch" condition. A "no switch" or parallel propagation condition is commonly created by an induced change in one of the guides, normally caused by an electric field induced change of the index of refraction (dn/dE) in one waveguide. The value of dn/dE is a factor which determines the magnitude of the electric field required to switch the light. The larger dn/dE, the smaller the voltage required for a given geometric configuration. Other factors affecting the operation of such devices are the index of refraction and width of the coupling material. Within limits, the smaller the difference between the indices of refraction of the waveguides and the coupling material, and the narrower the width of the coupling material, the shorter is the length of the parallel waveguides required for cross coupling. In turn, a shorter device length results in decreased device capacitance, and thus an increase in the maximum switching speed and a decrease of the energy required per switching cycle.

One such electro-optic coupler is described in U.S. Pat. No. 4,923,264 issued to Langer et al on May 8, 1990, which is incorporated by reference hereto. This patent describes an electro-optic coupler which is made of consecutively deposited layers of semiconductor material including a waveguide layer having a specific index of refraction, a second waveguide layer mode of an electro-optically active multiple quantum well structure having a second index of refraction, and a coupling layer between the waveguide layers having a third index of refraction. In operation, an electric field is applied across the coupler and the electric field affects the index of refraction of the multiple quantum well structure to make it equal to the index of refraction of the first waveguide. Therefore, the signal may be coupled from one waveguide to the other or the signal may be confined to the first waveguide.

However, all the aforementioned couplers, modulators and/or switches lack the ability to switch a signal in any one of four directions.

SUMMARY OF THE INVENTION

Accordingly, it is an object of the present invention to provide an electro-optic switch that is able to switch a signal in a multitude of directions, such as in a 4×4 or 6×6 port configuration or in any configuration with a multitude of ports.

It is another object of the present invention to provide such a switch that can be fabricated utilizing conventional growth techniques and etching techniques.

It is a still further object of the present invention to provide such a switch that can be incorporated in conventional electro-optic circuitry.

These and other objects of the present invention are accomplished by providing a multiple quantum well layer sandwiched between two core waveguide layers, which are, in turn, sandwiched by two cladding layers. This layering is deposited on a substrate with a metal contact and the top cladding layer is formed so as to form at least two parallel channels with metal contacts. The refractive indices of the various materials comprising the layers are chosen such that the cladding layers and the multiple quantum well layer have refractive indices which are less than the refractive index of the core waveguide layers, but which are different from one another.

In operation, an electric field is applied to the structure via metal contacts on the parallel channels. Depending on the magnitude of the electric field the optical signal may be switched from one channel to the other channel and depending on the magnitude and direction of the electric field and the intensity of the optical signal, the optical signal may be switched from the upper waveguide to the lower waveguide. Thus, the optical signal may be switched from one or more input ports to any number of the output ports. The multiple quantum well is the mechanism that provides the coupling medium between the upper and lower waveguides wherein the evanescent light decaying into the multiple quantum well changes the index of refraction by an amount dependent on the amount or intensity of the light in the guide. This index will increase with increasing intensity until finally the changed index will be large enough so that the light is no longer confined in the upper waveguide and so that the light will be transferred to the lower waveguide.

Additional channels on the upper cladding layer may be added/ to form 6×6 or ports depending on the application.

BRIEF DESCRIPTION OF THE DRAWINGS

These and other features of the invention will become apparent in light of the following Detailed Description of the Invention and the attached drawing wherein:

The FIGURE is a cross-section illustration of one embodiment of the invention.

Please note that for purposes of illustration, the layering represented in the FIGURE has not been drawn to scale. Specific dimensions of the invention are given in the Detailed Description of the Invention.

DETAILED DESCRIPTION OF THE INVENTION

Now referring to the figure, there is shown a cross-section view of one embodiment of the invention. As shown, a metal contact 1 is disposed on a bottom side of a substrate 2. A multiple quantum well structure 5 is sandwiched between upper and lower waveguides 4 and 6. The upper and lower waveguides 4 and 6 are, then, in turn sandwiched between upper and lower cladding layers 3 and 7. Upper cladding layer 7 is formed such that two parallel channels 8 and 9 are made a part thereof. Each of the two parallel channels 8 and 9 have conductive contacts 10 and 11 disposed on top of them.

The refractive indices of the various materials comprising the layers are chosen such that the cladding layers and the multiple quantum well layer have refractive indices, $n_1$ and $n_3$, respectively, which are less than the refractive index of the core waveguide layers, $n_2$, but which are different from one another. The designations $n_1$, $n_2$, $n_3$ represent these different refractive indices. An example of semiconductor materials which may be used to form a device according to the present invention would be a composite of AlGaAs comprising the cladding and waveguide core layers and the multiple quantum well structure could consist of alternating layers of GaAs and AlGaAs. Typically, the multiple quantum well structure would have 30–100 periods of alternating 10 nm of GaAs and 20 nm of AlGaAs, which would result in a bulk linear refractive index of 3.502 at a wavelength of 850 nm. As those skilled in the art readily know, the refractive index of AlGaAs may be altered to form the different cladding and waveguide core layers by altering the concentrations of Al to Ga ratio in the various layers as the device is being deposited/grown. For example, $Al_{.15}Ga_{.85}As$ has a refractive index of 3.513 at a wavelength of 850 nm which may be used for the waveguide core layers and $Al_{.6}Ga_{.4}As$ has a refractive index of 3.21 at a wavelength of 850 nm which may be used as the cladding layers. Of course, other III–V semiconductor material composites may also be used for the present invention, such as InP/InGaAs and InGaAs/InAlAs. This type of layering is disclosed in Cada et al, "Multiple Quantum Well Coupling Element with Losses," *Applied Physical Letters*, Vol. 51 (10), September 1987, which is incorporated herein by reference hereto.

The parallel channels 8 and 9 are fabricated by taking the deposited/grown layers and then etching with standard processes known to those skilled in the art. Because the patterned parallel channels 8 and 9 are a part of the cladding layer, they have the same index of refraction, $n_1$. Therefore, the channels will act to confine an optical signal in either of two optical paths under the channels 8 and 9 when the optical signal is introduced into the upper waveguide core 6. As those skilled in the art will recognize from this disclosure, more channels can be formed in cladding layer 7.

In operation, an electric field of predetermined magnitude and direction is applied to the device 100 via either one or both (all if there are more than one channel) of conductive contacts 10 and 11. Depending on the magnitude and direction of the electric field, the optical signal that is introduced in upper waveguide core 6 may be switched from one optical path to another optical path created by the channels 8 and 9 in the cladding layer 7. Further, with the device 100, the optical signal may also be switched between upper and lower waveguide cores 4 and 6 depending on the intensity of the optical signal and the magnitude and direction of the applied electrical field. The multiple quantum well is the mechanism that provides the coupling medium between the upper and lower waveguides wherein the evanescent light decaying into the multiple quantum well changes the index of refraction by an amount dependent on the amount or intensity of the light in the guide. This index will increase with increasing intensity until finally the changed index will be large enough so that the light is no longer confined in the upper waveguide and so that the light will be transferred to the lower waveguide.

Accordingly, given the proper magnitude and direction of the applied electric field and the intensity of the optical signal, the optical signal may be switched to any one or more of the output ports of the device. Those skilled in the art will realize that other embodiments may also be engineered given this disclosure. For example, a 6×6 switch may also be formed by adding another or more channels in the upper cladding layer.

Other and different approximations to the optic switch described herein may occur to those skilled in the art. Accordingly, having shown and described what is at present considered to be a single preferred embodiment of the invention, it should be understood that the same has been shown by way of illustration and not limitation. And all modifications, alterations, and changes coming within the spirit and scope of the invention are herein meant to be included.

What is claimed is:

1. An multidirectional optical switch comprising:

at least two optical waveguide core layers having a first refractive index;

at least two cladding layers which sandwich the at least two optical waveguide core layers, the cladding layers having a second index of refraction, wherein at least one of the two cladding layers has at least two raised channels;

a multiple quantum well structure having a third refractive index, the multiple quantum well structure being sandwiched between the at least two optical waveguide cores; and means to apply an electric field to the switch via the two channels wherein a first predetermined applied electric field causes an optical signal to switch from one channel to another channel and wherein a second predetermined applied electric field causes the third refractive index to change so as to permit an optical signal to be switched from one optical waveguide core layer to another optical waveguide core layer.

* * * * *